US011443098B1

(12) United States Patent
Goel et al.

(10) Patent No.: US 11,443,098 B1
(45) Date of Patent: Sep. 13, 2022

(54) FEDERATED RECURSIVE USER INTERFACE ELEMENT RENDERING

(71) Applicant: Amazon Technologies, Inc., Seattle, WA (US)

(72) Inventors: Mansi Goel, New Delhi (IN); Nilanjan Basu, Kolkata (IN); Ravi Sekhar Chilmakuri, Hyderabad (IN); Shreekanth Pandurang Lakshmeshwar, Bengaluru (IN); Pramod Kumar Singh, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 532 days.

(21) Appl. No.: 15/427,615

(22) Filed: Feb. 8, 2017

(51) Int. Cl.
*G06F 40/106* (2020.01)
*G06F 9/451* (2018.01)
*G06F 40/14* (2020.01)
*G06F 40/123* (2020.01)

(52) U.S. Cl.
CPC ............ *G06F 40/106* (2020.01); *G06F 9/451* (2018.02); *G06F 40/123* (2020.01); *G06F 40/14* (2020.01)

(58) Field of Classification Search
CPC .. G06F 17/212; G06F 9/4443; G06F 17/2205; G06F 17/2247; G06F 40/106; G06F 40/123; G06F 40/14; G06F 9/451
USPC ........................................................ 715/234
See application file for complete search history.

(56) References Cited

U.S. PATENT DOCUMENTS

| | | | | |
|---|---|---|---|---|
| 7,917,859 | B1* | 3/2011 | Singh | G06F 9/451 715/763 |
| 8,131,706 | B2* | 3/2012 | Altrichter | G06F 9/44526 707/707 |
| 8,302,092 | B2* | 10/2012 | Alverson | G06F 8/61 717/176 |
| 9,535,912 | B2* | 1/2017 | Guo | G06F 16/48 |
| 10,007,555 | B1* | 6/2018 | Kuhne | G06F 9/445 |
| 2007/0250839 | A1* | 10/2007 | Van Der Sanden | G06F 9/4443 719/315 |
| 2009/0187542 | A1* | 7/2009 | Begley | G06F 16/907 |
| 2010/0023875 | A1* | 1/2010 | Choudhary | G06F 9/451 715/748 |
| 2010/0050130 | A1* | 2/2010 | Farn | G06F 8/38 715/853 |
| 2010/0211865 | A1* | 8/2010 | Fanning | G06F 17/30905 715/234 |
| 2011/0078556 | A1* | 3/2011 | Prasad | G06F 9/451 715/234 |
| 2011/0141031 | A1* | 6/2011 | McCullough | G06F 3/0481 345/173 |
| 2012/0110499 | A1* | 5/2012 | Hance | G06F 3/0482 715/781 |
| 2013/0097519 | A1* | 4/2013 | Andersson | G06F 9/4443 715/744 |
| 2014/0047027 | A1* | 2/2014 | Moyers | H04L 51/04 709/204 |

(Continued)

Primary Examiner — Thu V Huynh
(74) Attorney, Agent, or Firm — Thomas | Horstemeyer LLP

(57) ABSTRACT

A rendering engine is disclosed that provides to federation of user interface elements and recursive execution of user interface elements. By federating user interface elements, the code for maintaining the various elements can be separately maintained, created, and updated without affecting other elements or the page layout of a particular page in a site.

20 Claims, 6 Drawing Sheets

(56) References Cited

U.S. PATENT DOCUMENTS

2015/0006519 A1* 1/2015 Jain .................... G06F 11/3636
707/723
2018/0150650 A1* 5/2018 Saunders .......... G06F 17/30864

* cited by examiner

150

US 11,443,098 B1

FEDERATED RECURSIVE USER INTERFACE ELEMENT RENDERING

BACKGROUND

A network site may include any number of content pages, such as web pages. A network site for an online retailer may include, for example, one or more content pages for each category of items offered for order by the online retailer as well as other content pages. When a request to generate a content page is received from a client device via a browser, for example, the network site can render a page based upon a layout for the page and code contained within the various user interface elements.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Embodiments of the present disclosure are related to rendering content pages and content within content pages by obtaining markup language from separately maintained and separately executed user interface elements. Embodiments of the disclosure can obtain a request to render a content page on behalf of a requesting user or requesting client device. A page layout that defines how the content page should be rendered can be selected. The page layout can define the layout of various user interface elements that are placed within the content page. The user interface elements can be associated with code that outputs markup language for placement within content page according to the page layout.

User interface elements can be referenced by the page layout so that when a rendering engine encounters such a reference, the rendering engine can execute the user interface element or request markup language from the user interface element for placement within a particular location from which the user interface element was referenced by the page layout.

The user interface element can be federated from the page layout. In other words, the code or functioning of the user interface element can be separated from the page layout as well as from other user interface elements within a particular page. In this way, in large organizations where multiple teams might provide data that can be placed within a particular page, each team can maintain the code or functioning of their respective user interface elements without having to affect another team's user interface element. This segmentation of user interface elements from one another and from the layout of a particular page can improve scalability within large organizations.

Figure 1A:
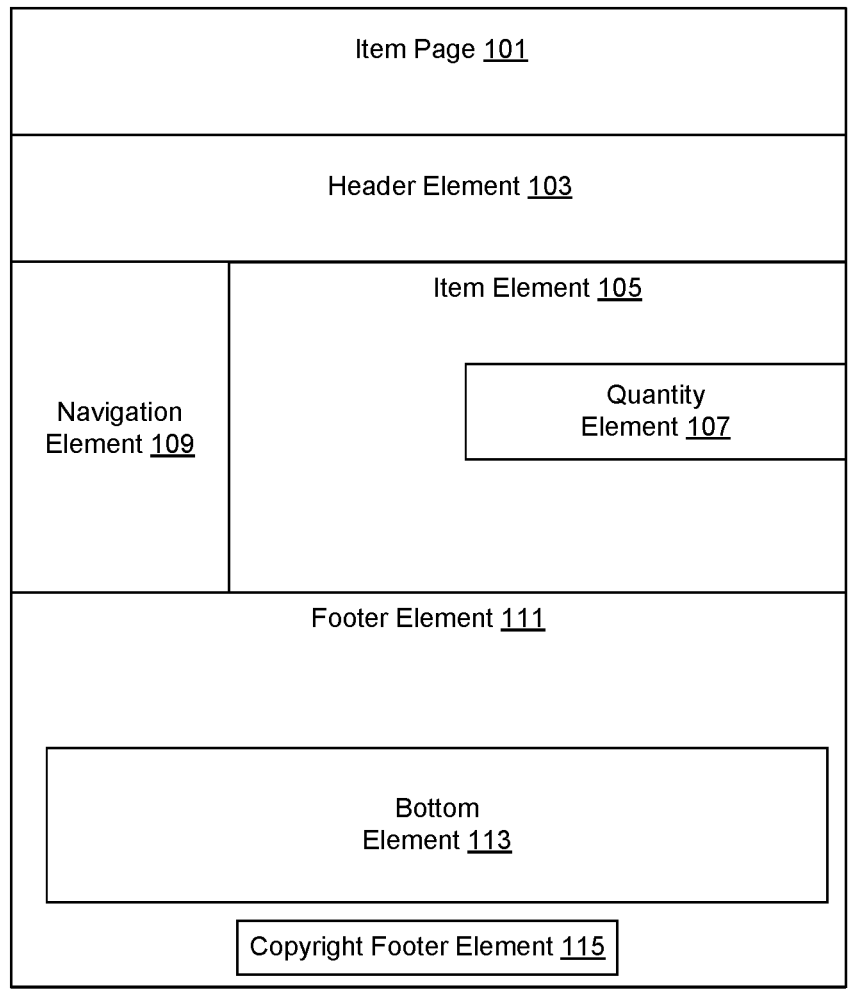
FIG. 1A is a pictorial diagram illustrating a page layout according to one example of the disclosure.

Referring to FIG. 1A, shown is a graphical example of a page layout 100 according to various examples. The page layout 100 is shown as a template in which content can be populated by various user interface elements. However, the page layout 100 can be stored or represented in examples of this disclosure in markup language, such as extensible markup language (XML) that can be interpreted or executed by a rendering engine. In one example, the page layout can be represented in JavaServer Pages (JSP) code, Active Server Pages (ASP) code, a custom scripting or interpreted language, or any other code or markup language from which a content page can be dynamically generated and populated with content.

In the example of FIG. 1A, the page layout 100 represents the layout of an item page 101. The page layout 100 of the item page 101 can reference various user interface (UI) elements that are placed at particular locations within the layout. The page layout 100 can be defined using HTML code or using another language that can define the location, size, behavior, or other appearance of elements in a page. Within the page layout 100, a tag or another type of reference that identifies one or more UI elements can be placed.

A particular UI element can correspond to executable code or a server process from which a rendering engine rendering the content page can request markup language for placement within a location in the content page. In the example page layout 100, the item page 101 can include a header element 103 that is defined in a particular location within the item page 101. The header element 103 can be referenced by a tag within the markup language defining the page layout 100 that uniquely identifies the UI element with respect to other UI elements in the page layout 100. The rendering engine can execute or cause to be executed code corresponding to the UI element. The code corresponding to the UI element can reside outside of the page layout 100 and separate from other UI elements referenced by the page layout 100. In some cases, the UI element, after executing, might determine that it need not return any markup language for placement within the requested content page.

Continuing the example of FIG. 1A, the item element 105 is placed within the page layout along with the navigation element 109. The item element 105 represents an example of a UI element that can reference another UI element, the quantity element 107. The markup language outputted by the item element 105 can include a tag or reference to the quantity element 107. In some examples, the quantity element 107 might in turn output markup language that includes another tag or reference to another UI element. Accordingly, a particular UI element can have children elements, and each of the children can also reference one or more subsequent children elements, and so on. In this way, UI elements can be nested or recursively dispersed throughout a page layout 100.

The item page 101 can also reference a navigation element 109 and a footer element 111. The footer element 111 can also output markup language that references a bottom element 113 and copyright footer element 115. In this example, an owner or maintainer of the footer element 111 can adjust the code that generates the outputted markup language to alter placement of either of its child elements or even omit the child elements without affecting the page layout 100 of the item page 101. In this sense, the footer element 111 is federated or independent from the item page 101 and the other UI elements that are not children of the footer element 111. The same can be said of the navigation element 109, the item element 105, the header element 103, and their respective child elements.

Figure 1B:
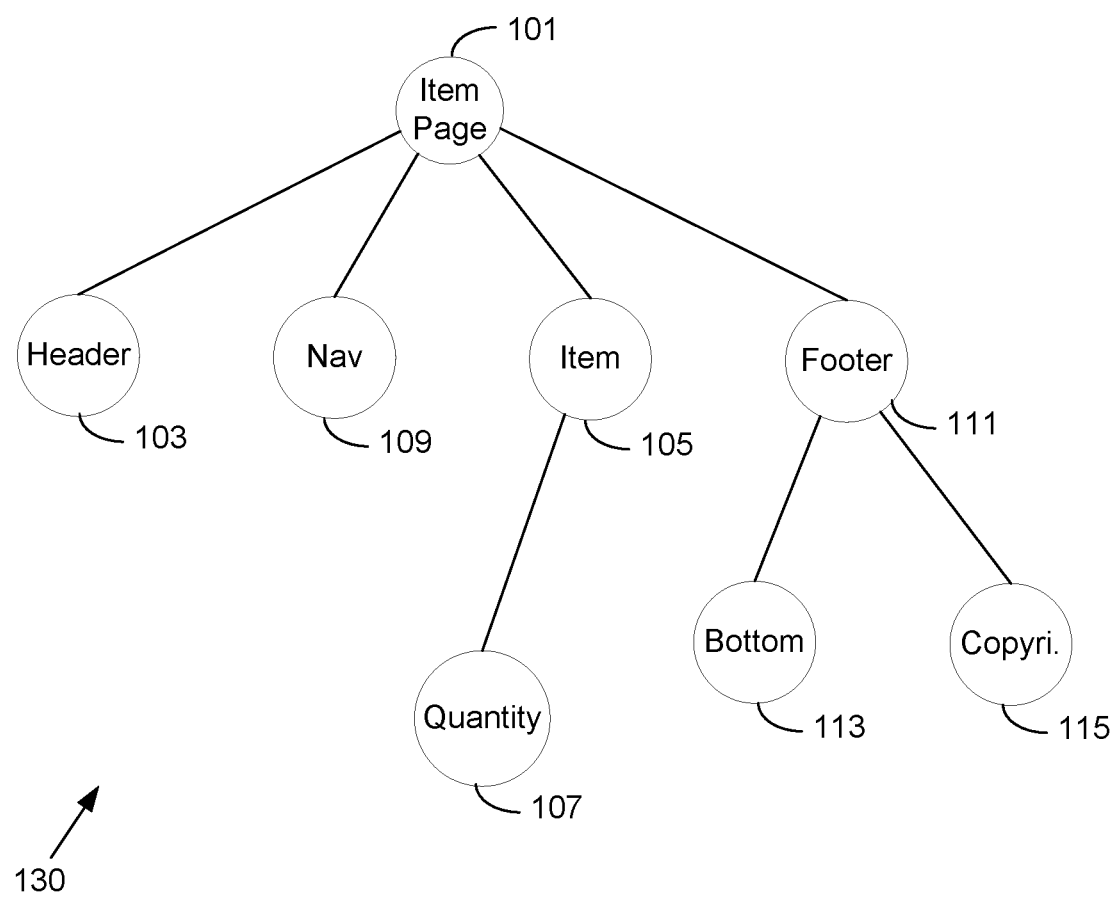
FIG. 1B is a pictorial diagram illustrating a page layout according to one example of the disclosure.

Referring to FIG. 1B, shown is an example of the page layout 100 of FIG. 1A represented in a tree structure 130 that shows the parent-child-sibling relationships between the various UI elements that are referenced by the page layout 100. The item page 101 represents the root node or parent node of all of the UI elements referenced by the page layout 100. Additionally, the item element 105, or the markup language outputted by the item element 105, references the quantity element 107, so the quantity element 107 is depicted as a child node of the item element 105. Additionally, the footer element 111, or the markup language outputted by the footer element 111, can include a tag or other reference that identifies the bottom element 113 and the copyright footer element 115.

Figure 1C:
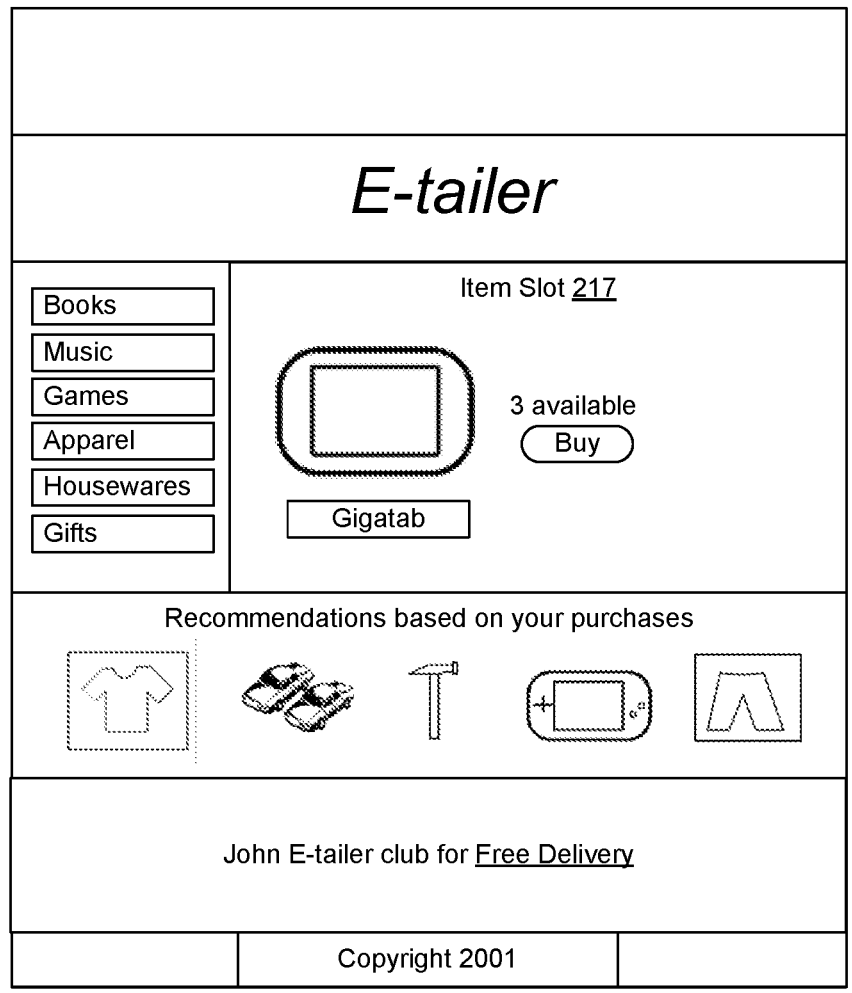
FIG. 1C is a pictorial diagram illustrating a content page according to one example of the disclosure.

Referring next to FIG. 1C, shown is an example of a content page 150 that is generated or rendered by the rendering engine according to examples of the disclosure. In the depicted example, a rendering engine has identified a page layout 100 corresponding to a requested content page on behalf of a user or a client device. The rendering engine can then identify the UI elements that are referenced by the page layout 100 by identifying an identifier within the page layout 100 that uniquely identifies the respective UI elements. The rendering engine can then identify a configuration for the respective UI elements that specifies the data required by the UI element to output markup language. The rendering engine can also identify or execute code that outputs markup language on behalf of the referenced UI elements. Upon obtaining markup language or an indication that a respective UI element does not have any outputted markup language, the rendering engine can place the markup language in the content page at a location specified by the page layout 100. This process is further discussed below.

Therefore, examples of the disclosure can allow for federation of UI elements that are placed within a content page 150. Federation of the UI elements within the content page can facilitate scalability within large organizations where multiple users or multiple teams are potentially maintaining or are responsible for different components within a particular page layout 100 corresponding to a content page 150.

Figure 2:
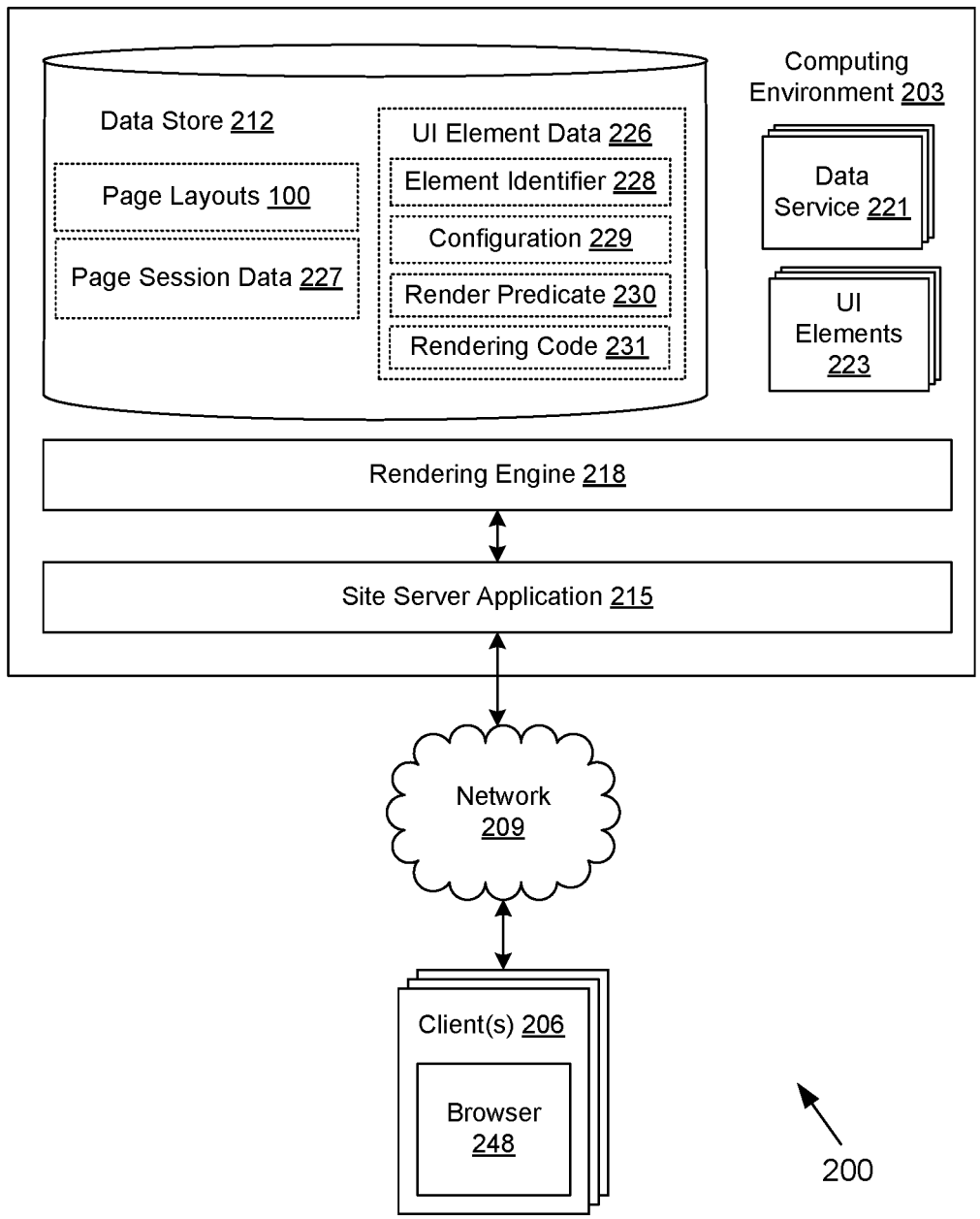
FIG. 2 is a block diagram of a networked environment according to various embodiments of the present disclosure.

With reference to FIG. 2, shown is a networked environment 200 according to various embodiments. The networked environment 200 includes a computing environment 203 and one or more client device 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 can comprise, for example, a server computer or any other system providing computing capability. Alternatively, the computing environment 203 can employ a plurality of computing devices that are arranged, for example, in one or more server banks or computer banks or other arrangements. Such computing devices may be located in a single installation or may be distributed among many different geographical locations. For example, the computing environment 203 can include a plurality of computing devices that together may comprise a cloud computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a site server application 215, a rendering engine 218, and other applications, services, processes, systems, engines, or functionality not discussed in detail herein. The site server application 215 is executed to receive content page requests from the client 106 over the network 209, and to serve up content pages in response to the content page requests. The site server application 215 may comprise a web server application such as Apache Hypertext Transfer Protocol (HTTP) Server, Microsoft® Internet Information Services (IIS), and/or any other type of content page server application or web server.

The rendering engine 218 is executed in response to a content page request received by the site server application 215 in order to generate a content page corresponding to the content page request. The rendering engine 218 can dynamically assemble a content page from a page template or page layout 100 by generating a content page in which content generated from various UI elements are placed. In one embodiment, the rendering engine 218 includes an interpreter for JavaServer Pages (JSP) that generates a content page. In one example, the rendering engine 218 can generate a hypertext markup language (HTML) page from a JSP page or a page layout 100 defined in another language that defines how the HTML page should be dynamically generated.

UI elements 223 define one or more applications and/or services that can be referenced by a page layout 100 and executed to provide dynamic content or markup language for placement within a content page. As a non-limiting example, a UI element 223 may generate markup language that is placed within a content page generated by the rendering engine 218 in response to a request to generate a content page received from a client device 106. In one embodiment, a UI element 223 can comprise JavaScript code or other client-side code that retrieves data that can be placed within a content page generated from a page layout. In one embodiment, a UI element 223 may comprise code that is executed by the rendering engine 218 to retrieve product recommendations as well as hyperlinks, text and imagery associated with the recommendations that can be placed in the content page. The UI element 223 can generate markup language that contains references to other UI elements 223, which causes the rendering engine 218 to potentially recursively execute other UI elements 223 after receiving markup language from a particular UI element 223.

A UI element 223 can also generate markup language based upon data that is dynamically retrieved from the data service 221 or that is retrieved from other data sources. In some embodiments, UI elements 223 can be implemented as various services that listen a request from the rendering engine 218 to generate markup language based upon contextual data associated with the request. The contextual data can represent a session identifier, an identity of a requested content page, or any other data associated with a session or request for the content page.

The data service 221 is a process or service that listens for request for data from UI elements 223 or the rendering engine 218 and provides the requested data or an error in response to the request. For example, a particular UI element 223 might rely upon user data to generate markup language. A UI element 223 might be charged with generating item recommendations based upon a user's browsing or purchase history and generating markup language corresponding to the history within a content page requested by a client device 106. Accordingly, the UI element 223 can request such data from the data service 221. The data service 221 can represent one or more processes that can be executed by or maintained by various users or teams that maintain the data sources from which a respective data service 221 can access data. In some scenarios, a particular UI element 223 may or may not be authorized to obtain certain data from a data service 221. The data service 221 can enforce access restrictions or logging on certain types of data, such as personal or financial data. In these instances, only certain UI elements 223 might be authorized to access such data from the data service 221.

The data store 212 can comprise a non-relational or "NoSQL" database that is configured to provide high transaction throughput and scalability. In some examples, a relational database can be used. The data stored in the data store 112 includes, for example, page layouts 100, UI element data 226, page session data 227, and potentially other data that is not shown. The example data referenced above is depicted as one example to facilitate discussion of examples of this disclosure. Page layouts 100 can specify the placement of user interface elements on a content page that a browser or other application on a client 106 can render. As a non-limiting example, in an electronic retail site implemented by the computing environment 203, the page layouts 100 can specify the placement of text, imagery, buttons, or other elements. As an alternative example, a page layout 100 for a search engine implemented by the computing environment 203 can specify where imagery, search forms, search results, etc. are placed on a content page generated by the rendering engine 218.

The page layout 100 can specify the location within a content page of a UI element 223 within a content page. The page layout 100 can be represented in XML or any other markup language that can be interpreted by the rendering engine 218 to generate or output HTML or presentation language that can be in turn rendered by a client device 206. The page layout 100 can reference UI elements 223 by inserting a tag or identifier that uniquely identifies a particular UI element 223. When the rendering engine 218 comes across such a tag, the UI element 223 is invoked or executed, as will be described below.

UI element data 226 represents data that facilitates execution of UI elements 223. The UI element data 226 can include a tag or element identifier 228 corresponding to an UI element 223. The element identifier 228 uniquely identifies a particular UI element 223 with respect to other UI elements 223. The UI element data 226 can also include a configuration 229 for the UI element 223. The configuration 229 can identify the data that is required in order to execute the UI element 223 or render markup language for a content page. The required data can be a particular class of data that is accessible through the data service 221. Accordingly, when executing the UI element 223, the rendering engine 218 can request the required data from the data service 221 housing the data, which can provide the data or an error if the UI element 223 is not authorized to access the data.

The render predicate 230 can specify a prerequisite that should be satisfied in order for a particular UI element 223 to generate markup language. In other words, if the render predicate 230 is not true or is not satisfied, the UI element 223 will not return any markup language for placement within the content page specified by a particular page layout 100. If the render predicate 230 is true or is satisfied, the UI element 223 will execute or return markup language.

The render predicate 230 can be associated with evaluating a contextual variable or a property of a session in which the content page is requested. The render predicate 230 can also be dependent upon external data retrieved from a data service 221. For example, the render predicate 230 can be based on a particular URL or domain associated with the request. As another example, the render predicate 230 can specify that the UI element 223 should return markup language if the data represented in the page meets a certain one or more requirements, such as a particular product name, product class, or product category.

The rendering code 231 represents code that is executed to generate markup language for placement within a content page corresponding to a page layout 100. The rendering code 231 can be maintained, updated, or changed without affecting the code for the page layout 100 or for other UI elements 223 that might be placed within a particular page layout 100. In this way, the rendering code 231 for the UI element 223 is federated from the code for the page layout 100 or other UI elements 223. The rendering code 231 can also represent a reference to a server process from which the rendering engine 218 can request execution of a UI element 223.

For example, the rendering code 231 within the UI element data 226 need not include executable code. Instead, the rendering code 231 element stored in the data store 212 can represent a reference to a server IP address on which a UI element 223 server process is listening. In response to receiving a request from the rendering engine 218, the rendering code 231 can return markup language for placement within a requested content page.

Page session data 227 represents contextual data associated with a particular request for a page or a particular session associated with the request. For example, the page session data 227 can include a URL associated with the requested content page, timestamp data, a session identifier, an item identifier, or other data represented within the page and from which a UI element 223 might generate markup language. For example, the page session data 227 can include a product identifier of a product represented within the page, and the UI element 223 might generate markup language for placement within the page based upon the product identifier.

The client device 206 is representative of a plurality of client devices that may be coupled to the network 209. The client device 206 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client device 206 can be configured to execute various applications such as a browser 248 and/or other applications. The browser 248 can be executed in a client device 206 to access and render content pages, such as web pages, or other network content served up by the computing environment 203 and/or other servers. The client device 206 may be configured to execute applications beyond browser 248 such as, for example, email applications, instant message applications, and/or other applications.

Figure 3:
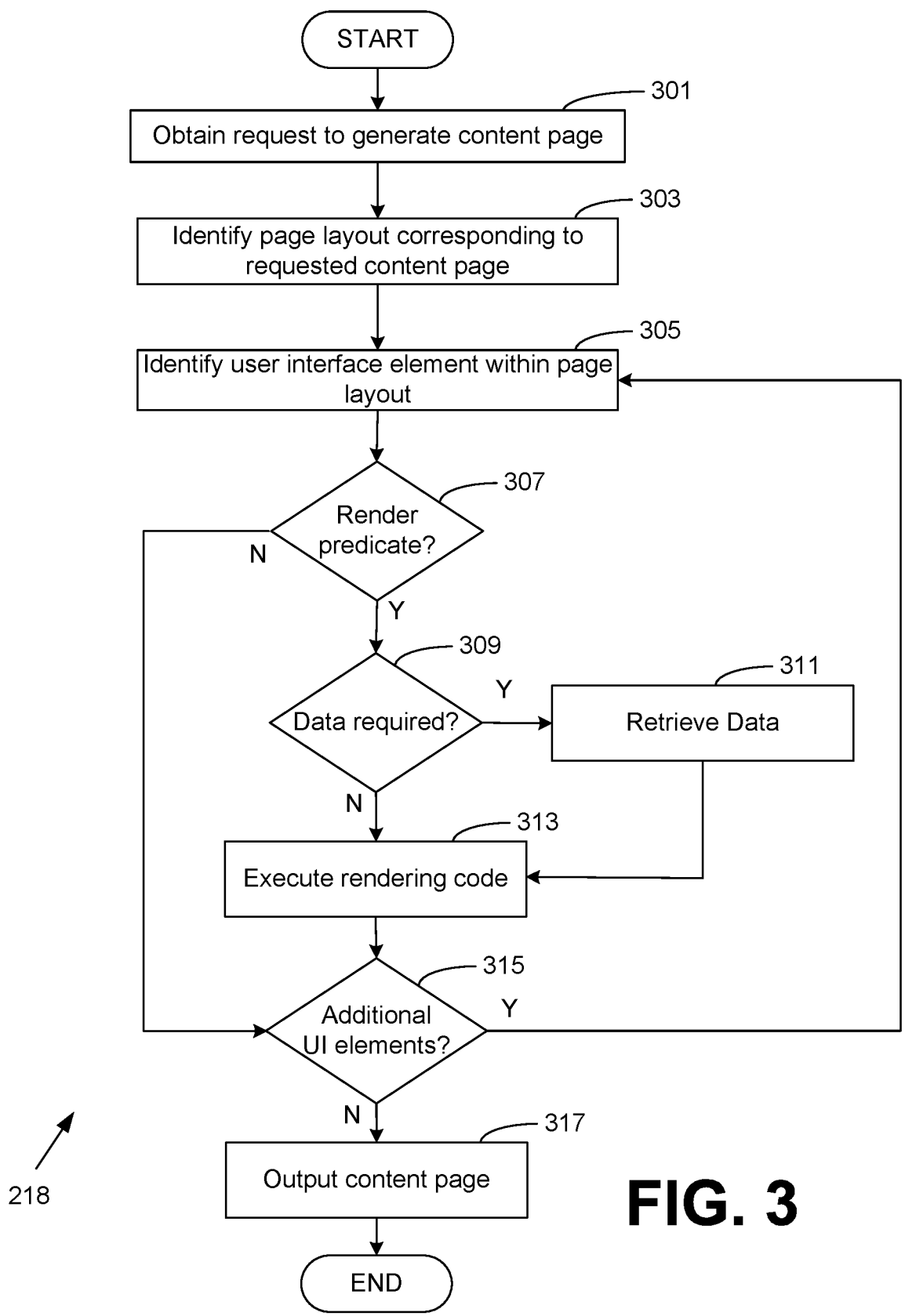
FIG. 3 is a flowchart illustrating examples of functionality implemented as portions of a computing environment in the networked environment of FIG. 2 according to various embodiments of the present disclosure.

Referring next to FIG. 3, shown is a flowchart that provides one example of the operation of a portion of the rendering engine 218 according to various embodiments. It is understood that the flowchart of FIG. 3 provides merely an example of the many different types of functional arrangements that may be employed to implement the operation of the portion of the rendering engine 218 as described herein. As an alternative, the flowchart of FIG. 3 can be viewed as depicting an example of elements of a method implemented in the computing environment 203 according to one or more embodiments. FIG. 3 illustrates an example of how the rendering engine 218 can generate a content page based upon a page layout 100 that references one or more UI elements 223.

Beginning with box 301, the rendering engine 218 can receive or obtain a request to generate a content page on behalf of a user or a client device 206. For example, the request can be received by the site server application 215 from the browser 248 executed by a client device 206. The site server application 215 can forward the request for the content page to the rendering engine, which can generate an HTML page or another form of markup language for the client device 206.

At box 303, the rendering engine 218 can identify a page layout 100 corresponding to the requested content page. In one example, the rendering engine 218 can maintain or access a mapping of a requested URL to a particular page layout 100. As another example, the site server application 215 can provide a page identifier with which the rendering engine 218 can identify page layout 100. At this stage, the rendering engine 218 can begin interpreting the page layout 100 to generate a requested content page containing markup language that can be rendered by the client device 206.

Accordingly, the rendering engine 218 can generate markup language as specified or directed by the page layout 100 until a reference to a UI element 223. At box 305, the rendering engine 218 can identify a tag or identifier within the user interface element 223. As noted above, the page layout 100 can include a tag, such as an XML, tag, with a particular value or tag name along with the identifier of a particular UI element 223.

Next, at box 307, the rendering engine 218 can evaluate the render predicate 230 corresponding to the UI element 223. The render predicate 230 can specify a prerequisite or requirement that determines whether the UI element 223 should return markup language for placement within the page layout 100. Evaluation of the render predicate 230 can be made based upon session data or information in the content page. Accordingly, if at box 307, the render predicate 230 specifies that the UI element 223 should not return markup language, the process can proceed to box 315, where the rendering engine 218 can continue rendering the requested content page and determine whether there are additional UI elements referenced by the page layout 100. If there are no additional UI elements 223 that require processing or execution, the process can proceed to box 317, where the rendering engine 218 outputs the content page as defined by the page layout 100. The content page can then be provided to the requesting client device 106.

From box 307, if evaluation of the render predicate 230 returns true, or if the render predicate 230 specifies that the UI element 223 should be further executed, the rendering engine 218 can determine whether the UI element 223 requires data to be retrieved from a data service 221. This determination can be made based upon whether the configuration 229 specifies or declares any external data requirements outside of the page session data 227 that is available to the UI element 223. If, at box 309, the rendering engine 218 determines that there are external data requirements, the process can proceed to box 311.

At box 311, the rendering engine 218 can request the data specified by the configuration 229 from a respective data service 221. The rendering engine 218 can make the request, as can the UI element 223. The data service 221 can either provide the requested data or return an error to the UI element 223 or rendering engine 218. From box 311, the process can proceed to box 313. Additionally, the configuration 229 specifies no external data requirements, the process can also proceed directly from box 309 to box 313.

At box 313, the rendering engine 218 can execute or cause the UI element 223 to execute the rendering code 231 associated with the UI element 223. The rendering code 231 can cause markup language to be output to the rendering engine 218, which can place the markup language in the location of the page layout 100 that the UI element 223 was referenced by the page layout 100. For example, if the UI element 223 was referenced in a particular field within an HTML table, the markup language output by the UI element 223 upon execution of the rendering code 231 can be placed in the field of the table.

Next, at box 315, the rendering engine 218 can determine whether there are additional UI elements 223 referenced by the page layout 100, including additional UI elements 223 that are referenced by the UI element 223 for which the rendering code 231 was executed at box 313. In other words, the rendering engine 218 can determine whether the UI element 223 is a parent UI element 223 and references a child UI element 223. If there are additional UI elements 223 referenced by the page layout 100 or the parent UI element 223, the process can return to box 305 and process to box 315 once again.

In the event that a child UI element 223 references another UI element 223, or has its own child UI elements 223, the rendering engine 218 can also execute those additional child UI elements 223 prior to completing execution of the parent UI element 223. Additionally, the parent UI element 223 might also reference more than one child UI element 223. In this way, the rendering engine 218 can recursively execute UI elements 223 that are referenced by the page layout 100 and by the UI elements 223 within the page layout.

In this way, federation of UI elements 223 is also facilitated because the rendering code 231 for the various UI elements 223 is kept separate from one another and from the code of the page layout 100. Accordingly, the rendering code 231 of each of the UI elements 223 can be separately maintained, created and/or updated without requiring modification of the page layout 100 or other UI elements 223 that generate markup language for placement within the content page corresponding to the page layout 100.

Figure 4:
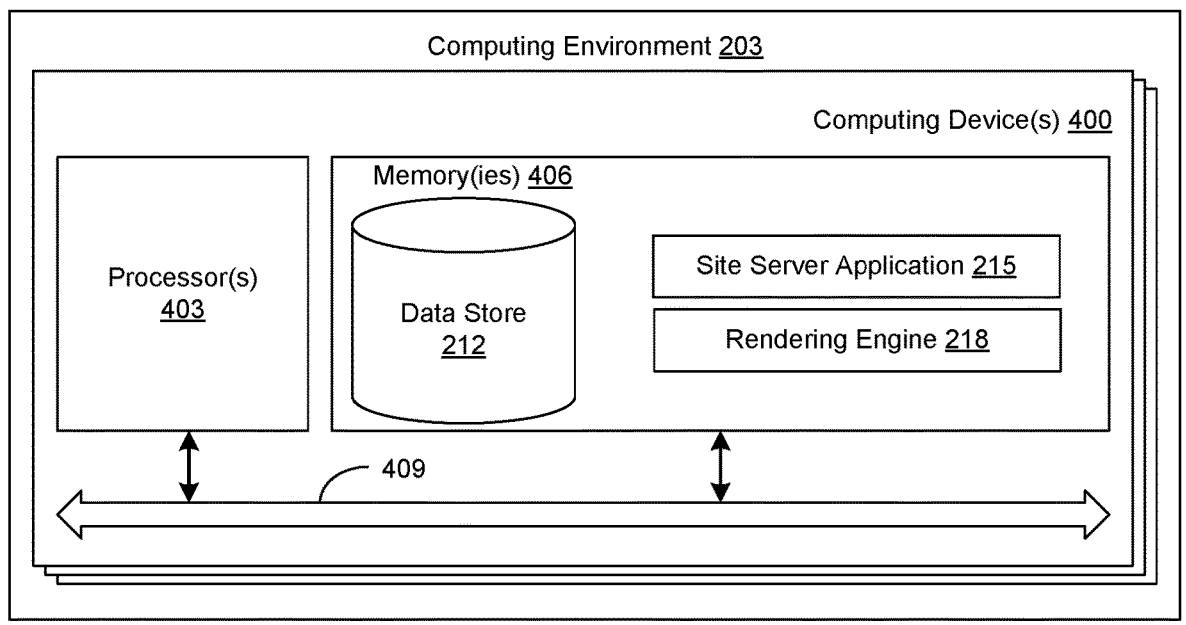
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the site server application 215, the rendering engine 218, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the site server application 215, the rendering engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the site server application 215 and the rendering engine 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in FIGS. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the rendering engine 218, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the site server application 215 or the rendering engine 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    obtaining, via at least one computing device, a request to render a page on behalf of a client device, the request being generated in response to the client device requesting the page;
    identifying, via the at least one computing device, a page layout corresponding to the page, the page layout defining a plurality of locations within the page layout;
    for each of the plurality of locations within the page layout:
        identifying a user interface element assigned to a particular one of the plurality of locations;
        retrieving a configuration associated with the user interface element, the user interface element specifying a configuration for rendering of the user interface element, wherein the configuration comprises a render predicate and a layout, the layout specifies at least one child user interface element of a plurality of child user interface elements, the at least one child user interface element comprises a respective configuration, a respective render predicate, a respective layout, and code that, when executed, generates respective markup language for placement within the respective layout;
    determining, based upon the render predicate, that the user interface element should be rendered, wherein the render predicate is based at least in part upon a contextual variable of a user session in which the page is requested, wherein the contextual variable is based at least in part upon a product identifier that identifies a product represented within the page;
    in response to determining, based upon the render predicate, that the user interface element should be rendered, retrieving data elements declared within the configuration, the data elements being retrieved externally from the user session, wherein the data elements are based at least in part upon an attribute of the product represented within the page;
    rendering, according to the layout specified by the configuration, the user interface element within the particular one of the locations based upon the data elements declared within the configuration; and
    recursively rendering, according to the layout and the respective layout, the at least one child user interface element referenced by the layout specified by the configuration of the user interface element.

2. The method of claim 1, wherein the user interface element is federated from the page layout.

3. The method of claim 1, wherein the at least one child user interface element is federated from the user interface element.

4. The method of claim 1, wherein the user interface element is referenced, using a user interface element identifier, by markup language defining the particular one of the plurality of locations.

5. The method of claim 4, wherein the configuration identifies at least one child identifier by referencing at least one user interface element identifier corresponding to the at least one child identifier.

6. The method of claim 1, wherein recursively rendering the at least one child user interface element referenced by the layout specified by the configuration of the user interface element comprises:
    determining, based upon the render predicate and the respective render predicate within the respective configuration, that the at least one child user interface element of the plurality of child user interface elements should be rendered.

7. The method of claim 1, further comprising determining, based upon the respective render predicate being not satisfied, that the at least one child user interface element should not be rendered within the layout.

8. A method, comprising:
    obtaining, via at least one computing device, a request to generate a content page;
    identifying, via the at least one computing device, a page layout corresponding to the content page;
    identifying, via the at least one computing device, a reference in the page layout that identifies a user interface element identifier corresponding to a user interface element;
    retrieving, via the at least one computing device, a configuration for the user interface element, wherein the configuration comprises a render predicate and a layout, the layout specifies at least one child user interface element of a plurality of child user interface elements, the at least one child user interface element comprises a respective configuration, a respective render predicate, a respective layout, and code that, when executed, generates respective markup language for placement within the respective layout;

evaluating, via the at least one computing device, that the render predicate specifies that the user interface element should be rendered within the content page, wherein the render predicate is based at least in part upon a contextual variable of a user session in which the content page is requested, wherein the contextual variable is based at least in part upon a product identifier, wherein the render predicate is further based at least in part upon the product identifier identifying a product that meets at least one of a product name, a product class, or a product category;

determining, via the at least one computing device and based upon the respective render predicate being not satisfied, that the at least one child user interface element should not be rendered within the layout;

executing, via the at least one computing device, code associated with the user interface element to generate markup language in response to the render predicate being met; and placing, via the at least one computing device, the markup language within the content page at a location corresponding to the reference in the page layout.

9. The method of claim 8, wherein the render predicate specifies conditions that determine that the user interface element should generate markup language for placement in the content page.

10. The method of claim 8, wherein the page layout further comprises a tag comprising an identifier that uniquely identifies the user interface element with respect to other user interface elements.

11. The method of claim 10, wherein the tag identifies a plurality of user interface elements for placement within the page layout.

12. The method of claim 8, further comprising obtaining, via the at least one computing device, data referenced by the configuration from a data provider accessible to the at least one computing device, wherein the data is retrieved externally from the user session.

13. The method of claim 12, wherein the data is identified by a data identifier within the configuration.

14. The method of claim 8, further comprising recursively rendering the user interface element and at least one of the plurality of child user interface elements to generate markup language for placement within the page layout.

15. The method of claim 8, wherein the user interface element is federated relative to the page layout corresponding to the content page.

16. A system comprising:
at least one computing device; and
a rendering engine executed by the at least one computing device, the rendering engine, when executed, causing the at least one computing device to at least:
obtain a request to generate a content page;
identify a page layout corresponding to the content page;
identify a reference in the page layout corresponding to a user interface element;
retrieve a configuration for the user interface element, wherein the configuration comprises a render predicate and a layout, the layout specifies at least one child user interface element of a plurality of child user interface elements, the at least one child user interface element comprises a respective configuration, a respective render predicate, a respective layout, and code that, when executed, generates respective markup language for placement within the respective layout;
determine that the render predicate specifies that the user interface element should be rendered within the content page, wherein the render predicate is based at least in part upon a contextual variable of a user session in which the content page is requested, wherein the contextual variable is based at least in part upon a product identifier, wherein the render predicate is further based at least in part upon the product identifier identifying a product that meets at least one of a product name, a product class, or a product category;
determine, based upon the respective render predicate being not satisfied, that the at least one child user interface element should not be rendered within the layout;
execute the code associated with the user interface element to generate markup language; and
place the markup language within the content page at a location corresponding to a tag in the page layout.

17. The system of claim 16, wherein the user interface element references another child user interface element, and the rendering engine causes the at least one computing device to at least retrieve a second configuration for the other child user interface element and execute the code associated with the other child user interface element prior to completing execution of the code associated with the user interface element.

18. The system of claim 17, wherein the code associated with the other child user interface element is separately maintained from the code corresponding to the user interface element.

19. The system of claim 16, wherein the code associated with the user interface element is separately maintained from the page layout.

20. The system of claim 16, wherein the rendering engine causes the at least one computing device to evaluate the render predicate, wherein the evaluation of the render predicate returns a Boolean value that specifies that the code associated with the user interface element should execute to generate the markup language.

* * * * *